(12) United States Patent
Bixler

(10) Patent No.: US 12,297,883 B2
(45) Date of Patent: May 13, 2025

(54) ELASTOMERIC BUSHING WITH FERRULE

(71) Applicant: The Pullman Company, Milan, OH (US)

(72) Inventor: Michael Bixler, Milan, OH (US)

(73) Assignee: The Pullman Company, Milan, OH (US)

( * ) Notice: Subject to any disclaimer, the term of this patent is extended or adjusted under 35 U.S.C. 154(b) by 389 days.

(21) Appl. No.: 17/981,905

(22) Filed: Nov. 7, 2022

(65) Prior Publication Data

US 2024/0151288 A1    May 9, 2024

(51) Int. Cl.
*F16F 1/38*    (2006.01)

(52) U.S. Cl.
CPC .......... *F16F 1/3821* (2013.01); *F16F 1/3856* (2013.01); *F16F 2234/02* (2013.01)

(58) Field of Classification Search
CPC .......... F16F 1/38; F16F 1/3821; F16F 1/3828; F16F 1/3856; F16F 2234/02
See application file for complete search history.

(56) References Cited

U.S. PATENT DOCUMENTS

| | | | |
|---|---|---|---|
| 2,659,619 A * | 11/1953 | Kishline | F16F 1/38 267/293 |
| 3,572,677 A | 3/1971 | Damon | |
| 4,002,327 A | 1/1977 | Damon | |
| 5,301,414 A | 4/1994 | Gautheron | |
| 5,328,160 A * | 7/1994 | McLaughlin | F16F 1/38 267/293 |
| 6,899,323 B2 | 5/2005 | Takeshita et al. | |
| 7,267,485 B2 * | 9/2007 | Wagener | F16C 27/02 384/125 |
| 8,465,010 B2 | 6/2013 | Kuki et al. | |
| 10,017,020 B2 | 7/2018 | Andreasen et al. | |
| 10,208,791 B2 | 2/2019 | Kim | |
| 10,920,844 B2 | 2/2021 | Zimmerman et al. | |
| 11,313,432 B2 | 4/2022 | Rawlings | |
| 11,548,340 B2 * | 1/2023 | Otsu | F16F 13/10 |
| 11,644,064 B2 * | 5/2023 | Werner | F16C 33/201 267/141.2 |

(Continued)

FOREIGN PATENT DOCUMENTS

| | | |
|---|---|---|
| CN | 101871498 A | 10/2010 |
| CN | 209409736 U | 9/2019 |

(Continued)

*Primary Examiner* — Thomas W Irvin
(74) *Attorney, Agent, or Firm* — Harness, Dickey & Pierce, P.L.C.

(57) ABSTRACT

An elastomeric bushing comprises an inner sleeve including a first end face and an opposite second end face. An elastomeric bumper is disposed around and directly engages the inner sleeve. The elastomeric bumper includes an annular void. An outer sleeve is disposed around the inner sleeve and the elastomeric bumper, spaced apart from the inner sleeve, and directly engages the elastomeric bumper. A one-piece monolithic ferrule includes a cylindrical sidewall surrounding a portion of the inner sleeve, an end wall, and a collar. The end wall radially inwardly extends from the side wall and overlaps the first end face of the inner sleeve. The collar has an outer surface positioned within the outer sleeve and within the annular void to limit the radial extent of relative movement between the inner and outer sleeves.

20 Claims, 3 Drawing Sheets

(56) References Cited

U.S. PATENT DOCUMENTS

| | | | |
|---|---|---|---|
| 11,815,149 B2 * | 11/2023 | Bixler | F16F 1/3863 |
| 12,123,474 B2 * | 10/2024 | Purreiter | B60K 5/1291 |
| 2003/0156889 A1 | 8/2003 | Gautheron | |
| 2021/0148407 A1 * | 5/2021 | Werner | B60G 11/16 |
| 2021/0356014 A1 * | 11/2021 | Purreiter | F16F 1/3828 |
| 2022/0282764 A1 * | 9/2022 | Hosoda | F16F 13/1481 |
| 2022/0364623 A1 * | 11/2022 | Bixler | F16F 1/3835 |

FOREIGN PATENT DOCUMENTS

| | | | |
|---|---|---|---|
| CN | 113847371 A | 12/2021 | |
| CN | 215214491 U | 12/2021 | |
| DE | 102006052917 A1 | 5/2008 | |
| DE | 102011013678 A1 | 9/2012 | |
| EP | 1691104 A1 | 8/2006 | |
| FR | 2181861 A1 | 12/1973 | |
| FR | 3086357 A1 | 3/2020 | |
| GB | 532396 A | 1/1941 | |
| GB | 773746 A | 5/1957 | |
| WO | WO-9747897 A1 | 12/1997 | |
| WO | WO-2011009512 A1 | 1/2011 | |

* cited by examiner

ELASTOMERIC BUSHING WITH FERRULE

FIELD

The present disclosure relates to an elastomeric bushing for attaching a component to a vehicle. More particularly, the present disclosure relates to an elastomeric bushing for attaching a component to a vehicle where the elastomeric bushing includes a ferrule with an internal travel limiter.

BACKGROUND

The statements in this section merely provide background information related to the present disclosure and may not constitute prior art.

Vehicles are commonly designed using an independent front and/or an independent rear suspension system to connect wheel end components of the vehicle (the unsprung portion) and the body of the vehicle (the sprung portion). The independent suspension systems normally include an upper control arm, a lower control arm and a hub or knuckle which supports the wheel and tire of the vehicle. Each control arm is attached to the frame or other structural component of the vehicle using one or more elastomeric bushings. The elastomeric bushings may consist of an outer metal housing which is pressed into the control arm. An elastomer is positioned within the outer metal housing. An inner metal housing extends through the center of the elastomer. The inner metal housing is attached to a bracket on the frame. A supporting structure of the sprung portion of the vehicle or a bolt extends through the inner metal housing and secures an end of the control arm to the frame. As the vehicle travels, relative movement between the sprung and unsprung portions of the vehicle is accommodated by flexing of a coil spring, a torsion bar, an air spring or by another resilient device. The flexing of the resilient device causes the ends of the control arms to pivot on the elastomeric bushings which secure the control arms to the sprung portion of the vehicle.

The elastomeric bushings are used to facilitate this pivotal motion and to isolate the vehicle from shock. The elastomer positioned between the inner and outer metal housings effectively isolates the sprung portion of the vehicle from the unsprung portion of the vehicle. While these elastomeric bushings have performed satisfactorily in the field, a need for an alternate design exists.

Vehicle manufacturers have recently increased their demand for elastomeric bushings exhibiting a low or "soft" rate while concurrently requiring that the elastomeric bushings remain robust when subjected to high loads. Existing designs may allow a magnitude of radial travel of the inner housing relative to the outer housing that induces relatively high stress on the elastomer. It is desirable to increase the fatigue life of the elastomer within the load environment desired by the customer. By limiting the maximum amount of radial travel, the maximum stress created within the elastomer will also be limited. A significant increase in fatigue life may result.

It may be beneficial to develop an elastomeric bushing including a ferrule providing two functions in a single device. A monolithic one-piece ferrule includes a collar functioning as an internal travel limiter that defines the maximum amount of radial travel between an inner sleeve and an outer sleeve. It also includes an end wall functioning as an axial load bearing device. It may be beneficial to achieve such functions using internal geometry of the elastomeric bushing with ferrules without relying on other structures positioned external to the bushing to expand the capabilities of the elastomeric bushing, improve the strength and durability of the bushing while minimizing manufacturing costs associated with the new elastomeric bushing.

SUMMARY

This section provides a general summary of the disclosure and is not a comprehensive disclosure of its full scope or all of its features.

An elastomeric bushing comprises an inner sleeve including a first end face and an opposite second end face. An elastomeric bumper is disposed around and directly engages the inner sleeve. The elastomeric bumper includes an annular void. An outer sleeve is disposed around the inner sleeve and the elastomeric bumper, spaced apart from the inner sleeve, and directly engages the elastomeric bumper. A one-piece monolithic ferrule includes a cylindrical sidewall surrounding a portion of the inner sleeve, an end wall, and a collar. The end wall radially inwardly extends from the side wall and overlaps the first end face of the inner sleeve. The collar has an outer surface positioned within the outer sleeve and within the annular void to limit the radial extent of relative movement between the inner and outer sleeves.

In another form, the disclosure describes an elastomeric bushing comprising an inner sleeve including a first end face and an opposite second end face; an elastomeric bumper disposed around and directly engaging the inner sleeve, the elastomeric bumper including a first annular void and a spaced apart second annular void; an outer sleeve disposed around the inner sleeve and the elastomeric bumper, the outer sleeve being spaced apart from the inner sleeve and directly engaging the elastomeric bumper, the outer sleeve including a first end and an opposite second end; a one-piece monolithic first ferrule including a cylindrical sidewall surrounding a portion of the inner sleeve, an end wall, and a collar, the end wall radially inwardly extending from the side wall and overlapping the first end face of the inner sleeve, the collar having an outer surface positioned within the outer sleeve, within the first annular void, and radially outward of the sidewall, the outer surface being spaced apart from the elastomeric bumper; and a one-piece monolithic second ferrule overlapping the second end face and surrounding a portion of the inner sleeve, the second ferrule including a collar positioned within the outer sleeve and within the second annular void.

The present disclosure also describes an elastomeric bushing comprising an inner sleeve including a first end face and an opposite second end face; an elastomeric bumper disposed around and directly engaging the inner sleeve, the elastomeric bumper including a circumferentially extending outer portion, a circumferentially extending inner portion and an intermediate web portion interconnecting the inner and outer portions, the intermediate portion having an axial length less than the inner and outer portions defining a first annular void and a spaced apart second annular void; an outer sleeve disposed around the inner sleeve and the elastomeric bumper, the outer sleeve being spaced apart from the inner sleeve and directly engaging the elastomeric bumper, the outer sleeve including a first end and an opposite second end; and a one-piece monolithic ferrule including a cylindrical sidewall surrounding a portion of the inner sleeve, an end wall, a radially extending flange and a collar, the end wall radially inwardly extending from a first end of the side wall and overlapping the first end face of the inner sleeve, the flange radially outwardly extending from a second end of the sidewall, the collar having an outer surface positioned within the outer sleeve and within the first annular void, the outer surface being spaced apart from the elastomeric bumper.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
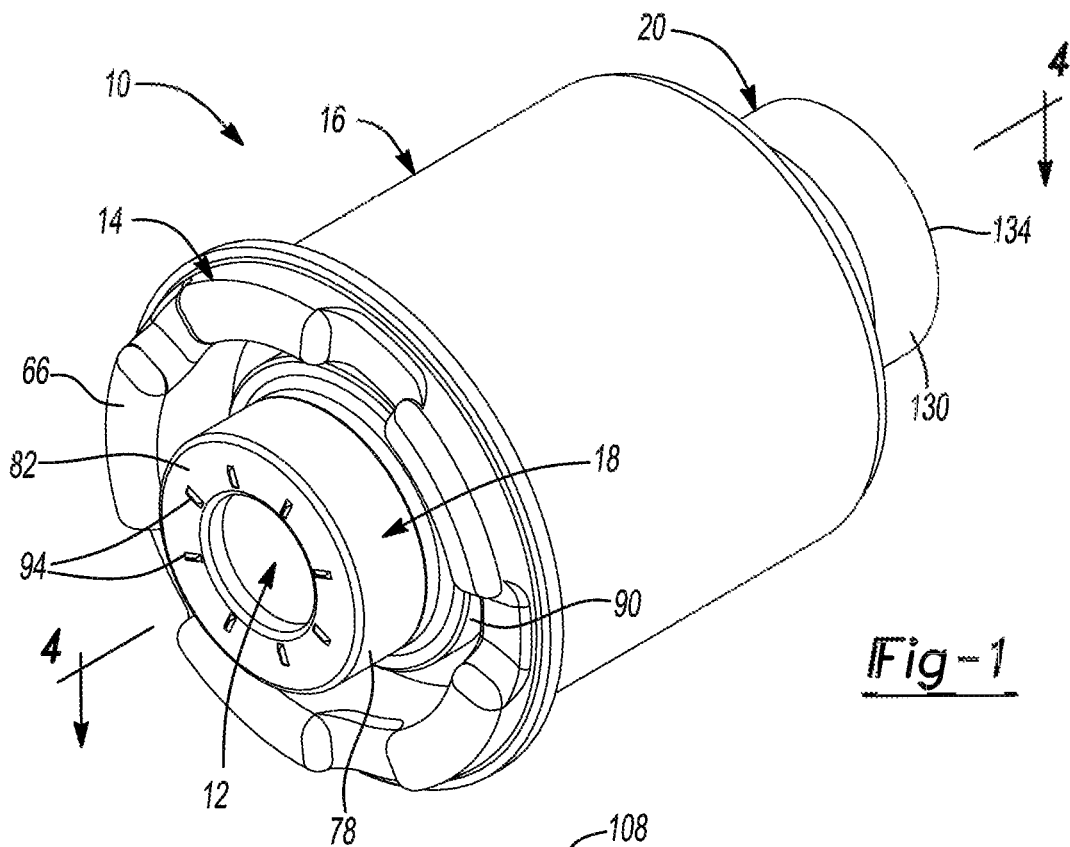
FIG. 1 is a perspective view of an exemplary elastomeric bushing constructed in accordance with the teachings of the present disclosure.
Figure 2:
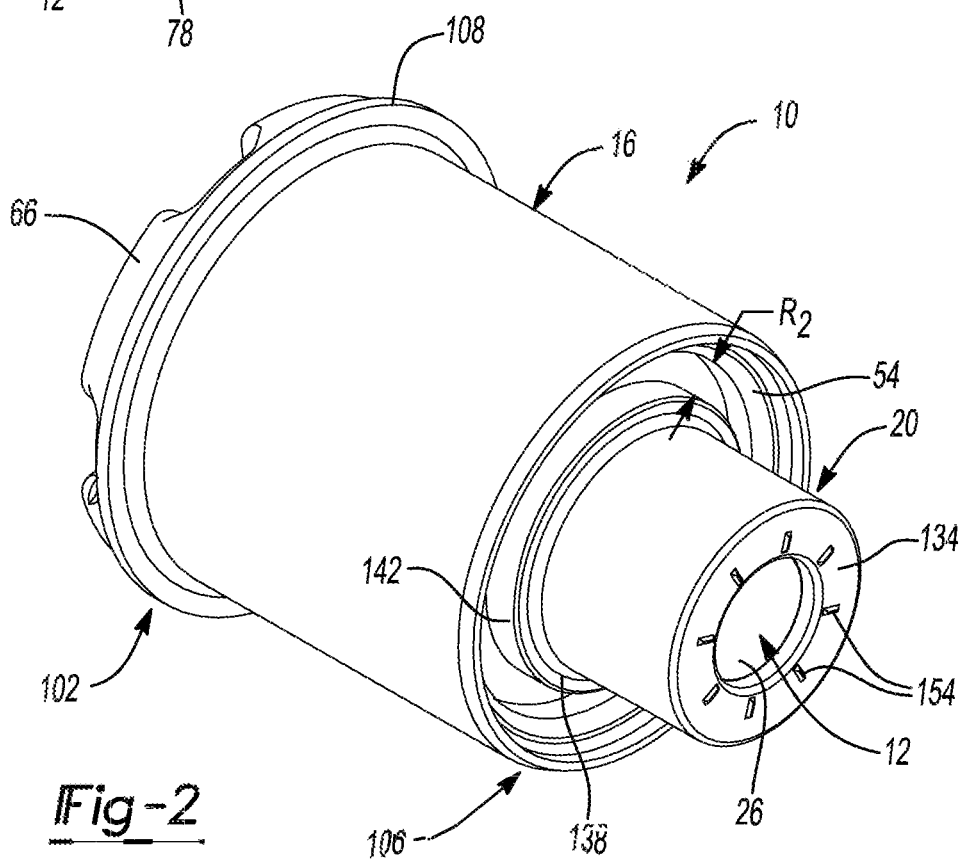
FIG. 2 is another perspective view of the elastomeric bushing depicted in FIG. 1.
Figure 3:
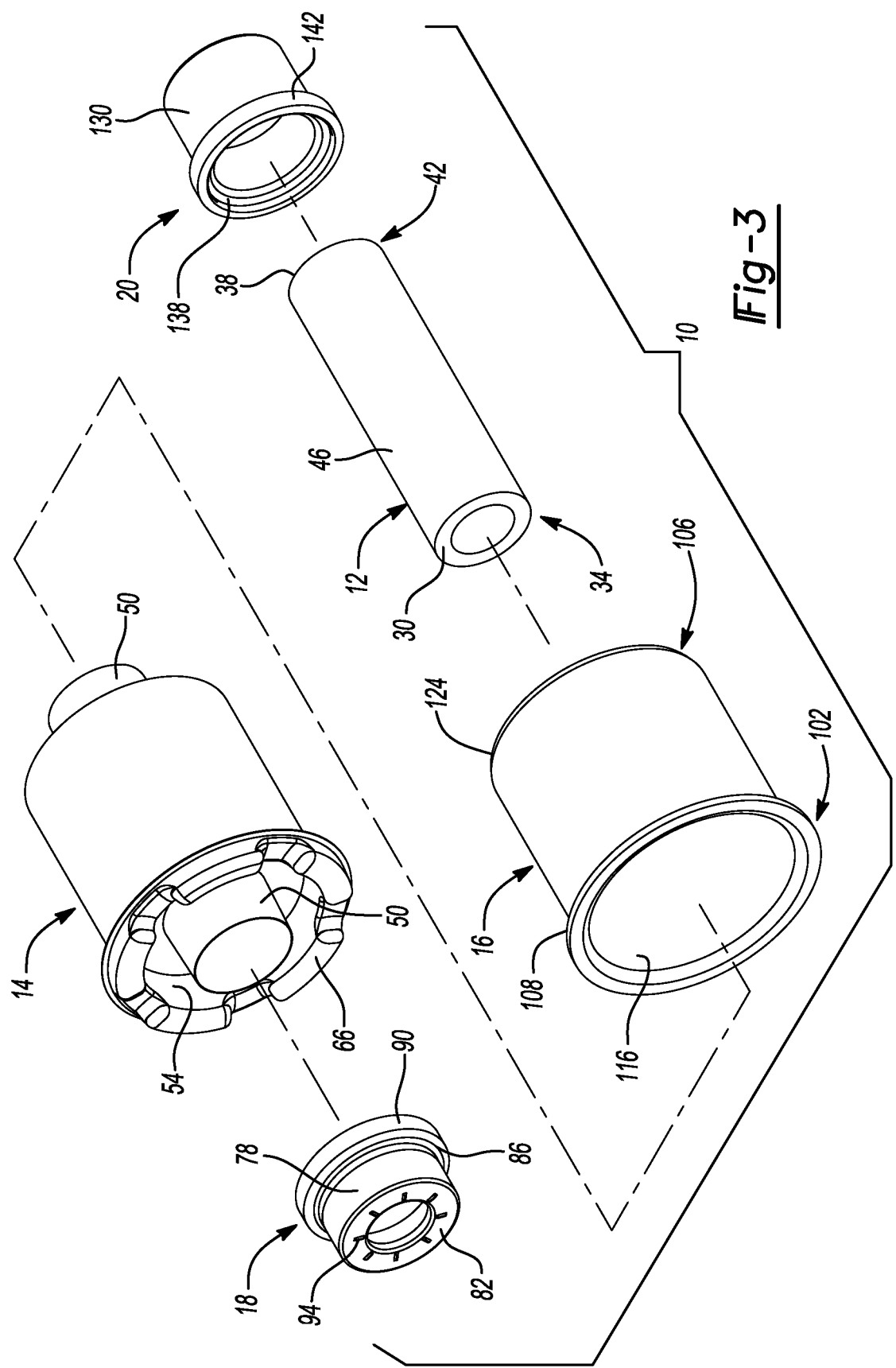
FIG. 3 is an exploded perspective view of the elastomeric bushing.

An exemplary embodiment elastomeric bushing will now be described more fully with reference to the accompanying drawings with the elastomeric bushing being identified at reference numeral 10.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, elastomeric bushing 10 is an assembly comprising an inner sleeve 12, an elastomeric bumper 14, an outer sleeve 16, a first ferrule 18, and a second ferrule 20. Inner sleeve 12 is illustrated as a metal tube having a generally circular cylindrical shape. It is within the scope of the present disclosure to have different inner sleeves, including but not limited to, a solid tubular component. In the embodiment depicted in the figures, inner sleeve 12 includes a substantially cylindrical through bore 26 extending along a longitudinal axis 28 through the first end face 30 positioned at a first end 34 and through a second end face 38 positioned at a second end 42 opposite first end 34. Inner sleeve 12 includes a cylindrically shaped outer surface 46. Inner sleeve 12 may be constructed from a low carbon steel such as SAE 1008 or SAE 1010.

Figure 4:
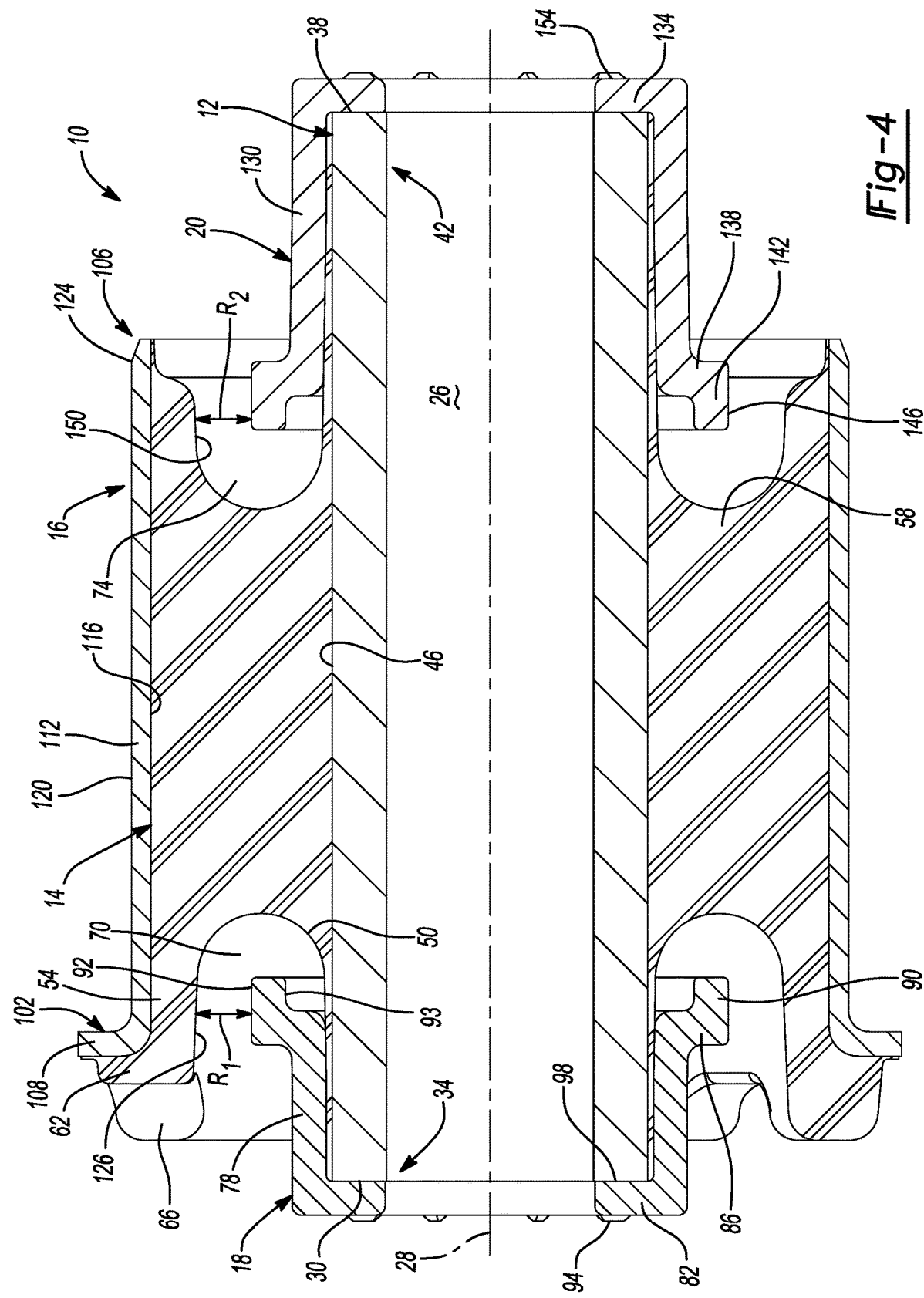
FIG. 4 is a cross-sectional view through the bushing taken along line 4-4 as depicted in FIG. 1.

Elastomeric bumper 14 includes an inner portion 50, an outer portion 54 and an intermediate web portion 58 integrally formed with and interconnecting inner portion 50 with outer portion 54. The figures depict elastomeric bumper 14 constructed as a one-piece monolithic elastomer such as natural rubber operable to provide a damping function for loads applied to elastomeric bushing 10. Inner portion 50 is depicted as having a substantially cylindrical shape with a tapered cross section reducing in thickness as cylindrical inner portion 50 extends towards first end 34 and second end 42 of inner sleeve 12. Elastomeric bumper 14 is bonded to outer surface 46 of inner sleeve 12 and the taper is optional. The taper may be provided as a manufacturing draft angle allowing easy removal of the bonded inner sleeve and elastomeric bumper 14 assembly from an injection molding die set into which molten elastomer is injected. FIG. 4 depicts the elastomeric bumper 14 extending the entire axial extent of inner sleeve 12 from first end face 30 to second end face 38. It should be appreciated, however, that the portion of elastomeric bumper 14 extending between first ferrule 18 and outer surface 46 as well as the portion of the elastomeric bumper 14 extending between second ferrule 20 and outer surface 46 of inner sleeve 12 need not be present.

Elastomeric bumper 14 further includes a radially outwardly extending flange portion 62 and circumferentially spaced apart castellations 66. Castellations 66 act as springs when elastomeric bushing 10 is installed in a vehicle ready for operation. It is contemplated that the castellations 66 will be at least somewhat compressed by a component positioned adjacent to elastomeric bushing 10. Elastomeric bumper 14 includes an first annular recess 70 positioned between inner portion 50 and outer portion 54 proximate first end 34 of inner sleeve 12. A second annular recess 74 is positioned between inner portion 50 and outer portion 54 of elastomeric bumper 14 on the opposite side of intermediate web portion 58 from first annular recess 70.

First ferrule 18 is a substantially cup-shaped member including a cylindrically shaped sidewall 78, a radially inwardly extending end wall 82, a radially outwardly extending flange 86 and a circumferentially extending collar 90. It is contemplated that first ferrule 18 is monolithically constructed as a one-piece member. First ferrule may be constructed beginning with a flat plate having a substantially constant thickness. The work-in-process plate is drawn to define to a generally cup-shaped member including end wall 82 and sidewall 78. Radially outwardly extending flange 86 and circumferentially extending collar 90 may be simultaneously formed in the same step or defined during one or more subsequent upsetting or stamping operations. Each of end wall 82, sidewall 78, flange 86 and collar 90 have substantially the same thickness. Collar 90 is cylindrically shaped and concentrically positioned relative to cylindrical shaped sidewall 78. Collar 90 includes an outer cylindrical surface 92 and an inner cylindrical surface 93. Both inner cylindrical surface 93 and outer cylindrical surface 92 are spaced apart from inner sleeve 12 and elastomeric bumper 14.

First ferrule 18 may be constructed from a mild steel such as SAE 1018 that is case hardened. The case hardening is primarily provided to assure that circumferentially spaced apart projections 94 maintain their geometrical shape after engagement with a vehicle suspension member (not shown) to resist relative rotation between first ferrule 18 and the suspension member. It is envisioned that the suspension member adjacent to and in immediate contact with first ferrule 18 will exhibit a lower hardness than the case-hardened surfaces of the ferrule. During installation of elastomeric bushing 10 to the vehicle, a fastener (not shown) may extend through bore 26 to apply a clamping load to the adjacent suspension members and elastomeric bushing 10. The suspension member may be deformed by projections 94 to provide a mechanical interlocking engagement.

End wall 82 of first ferrule 18 includes a seat 98 on the opposite side of projections 94. Seat 98 is engaged with first end face 30 of inner sleeve 12 after first ferrule 18 has been press fit over inner sleeve 12. A length of inner portion 50 may be trapped between inner sleeve 12 and sidewall 78. Collar 90 is axially positioned within an axial extent of outer sleeve 16. More particularly, outer sleeve 16 includes a first end 102 and an opposite second end 106. Collar 90 is positioned within outer sleeve 16 and resides between first end 102 and second end 106.

Outer sleeve 16 further includes a flange 108 radially outwardly extending from its cylindrical body 112. Outer sleeve 16 also includes a cylindrically shaped inner surface 116 as well as a cylindrically shaped outer surface 120. To ease installation of elastomeric bushing 10 within a suspension member of a vehicle, outer sleeve 16 may include a chamfer 124 at second end 106. In the embodiment illustrated, it is contemplated that elastomeric bushing 10 would be inserted within a suspension member until flange 108 engages the suspension member to provide a positive installed position. It should be appreciated that other elastomeric bushings constructed in accordance with the teachings of this disclosure do not require flange 108 or castellations 66.

To provide a radial travel limiting function, outer surface 92 of collar 90 is radially spaced apart a distance R1 from an inner surface 126 of outer portion 54 within first annular recess 70 when elastomeric bushing 10 is in an unloaded condition. When elastomeric bushing is installed and functioning in a vehicle, loads between inner sleeve 12 and outer sleeve 16 may cause collar 90 to engage inner surface 126 of elastomeric bumper 14. Collar 90 is axially positioned within the axial extent of outer sleeve 16 axially between first end 102 and second end 106. This relative positioning assures that load applied to outer portion 54 of elastomeric bumper 14 will be reacted and supported by outer sleeve 16 and the vehicle component into which it is positioned.

Damping characteristics of elastomeric bushing 10 maybe tailored or "tuned" for a particular customer's application by defining the magnitude of a distance R1 between collar 90 and outer portion 54. The damping characteristics of the bushing maybe further defined by varying the thickness of outer portion 54 proximate inner surface 116 at the axial location between collar 90 and outer sleeve 16. Distance R1 maybe varied by changing the magnitude of an outer diameter of collar 90 and the radial extent of first annular recess 70. The behavioral characteristics of elastomeric bushing 10 may be further defined by the compressive material properties of the elastomeric bumper 14.

Second ferrule 20 is substantially similar to first ferrule 18. The primary difference between the two ferrules is that a cylindrical sidewall 130 of second ferrule 20 extends a greater axial length than sidewall 78 of first ferrule 18. The axial length of second ferrule 20 is longer based on the particular geometry of the example depicted in the figures. Inner sleeve 12 extends further axially outside of outer sleeve 16 at second end 106 when compared to first end 102. Second ferrule is longer to account for the offset and assure that the collar of second ferrule 20 is positioned as described below.

In addition to sidewall 130, second ferrule 20 includes an end wall 134, a radially extending flange 136, and a circumferentially extending collar 142 each integrally formed with one another as a one-piece member. A radial spacing R2 exists between an outer circumferential surface 146 of collar 142 and an inner surface 150 of cylindrical outer portion 54. Collar 142 is also positioned within the axial extent of outer sleeve 16 between first end 102 and second end 106. It should be appreciated that spacing R1 need not be identically the same as R2. Second ferrule 20 also includes a plurality of circumferentially spaced apart and axially extending projections 154 for mechanical engagement with a suspension component (not shown). At the vehicular assembly, a mechanical fastener such as a cap screw extends through suspension components positioned on either side of elastomeric bushing and through bore 26. A clamp load is applied to the fastener to frictionally engage and possibly partially embed projections 94, 154 into their respective suspension components.

Elastomeric bumper 14 may be bonded to inner surface 116 of outer sleeve 16. Alternatively outer sleeve 16 and elastomeric bumper may be separate components assembled in a press-fit arrangement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Modifications and variations of the present disclosure are possible in light of the above teachings and may be practiced otherwise than as specifically described while within the scope of the appended claims.

What is claimed is:

1. An elastomeric bushing comprising:
    an inner sleeve including a first end face and an opposite second end face;
    an elastomeric bumper disposed around and directly engaging the inner sleeve, the elastomeric bumper including a first annular void and a spaced apart second annular void;
    an outer sleeve disposed around the inner sleeve and the elastomeric bumper, the outer sleeve being spaced apart from the inner sleeve and directly engaging the elastomeric bumper, the outer sleeve including a first end and an opposite second end;
    a one-piece monolithic first ferrule including a cylindrical sidewall surrounding a portion of the inner sleeve, an end wall, and a collar, the end wall radially inwardly extending from the side wall and overlapping the first end face of the inner sleeve, the collar having an outer surface positioned within the outer sleeve, within the first annular void, and radially outward of the sidewall, the outer surface being spaced apart from the elastomeric bumper; and
    a one-piece monolithic second ferrule overlapping the second end face and surrounding a portion of the inner sleeve, the second ferrule including a collar positioned within the outer sleeve and within the second annular void.

2. The elastomeric bushing according to claim 1, wherein radial movement of the outer sleeve relative to the inner sleeve is limited by the collar and the elastomeric bumper.

3. The elastomeric bushing according to claim 1, wherein the inner sleeve is a hollow cylindrically-shaped one-piece monolithic component.

4. The elastomeric bushing according to claim 1, wherein the elastomeric bumper is bonded to the inner sleeve.

5. The elastomeric bushing according to claim 1, wherein the inner sleeve is coaxially aligned with the outer sleeve.

6. The elastomeric bushing according to claim 1, wherein the inner sleeve axially extends beyond the outer sleeve at each end of the outer sleeve.

7. The elastomeric bushing according to claim 1, wherein a load attempting to axially move the outer sleeve relative to the inner sleeve is reacted by the collar of the first ferrule after a space between the collar of the first ferrule and the elastomeric bumper is eliminated.

8. The elastomeric bushing according to claim 1, wherein each of the end wall, the sidewall and the collar of the first ferrule have substantially the same thickness.

9. The elastomeric bushing according to claim 1, wherein an inner surface of the outer sleeve is bonded to the elastomeric bumper.

10. The elastomeric bushing according to claim 1, wherein the collar is shaped as a cylinder having an outer surface and an inner surface spaced apart from the both of the inner sleeve and the elastomeric bumper.

11. The elastomeric bushing according to claim 1, wherein the first ferrule includes a radially extending flange interconnecting its sidewall and collar.

12. The elastomeric bushing according to claim 1, wherein the first ferrule and the second ferrule are coaxially aligned.

13. An elastomeric bushing comprising:
    an inner sleeve including a first end face and an opposite second end face;
    an elastomeric bumper disposed around and directly engaging the inner sleeve, the elastomeric bumper including a circumferentially extending outer portion, a circumferentially extending inner portion and an intermediate web portion interconnecting the inner and outer portions, the intermediate portion having an axial length less than the inner and outer portions defining a first annular void and a spaced apart second annular void;
    an outer sleeve disposed around the inner sleeve and the elastomeric bumper, the outer sleeve being spaced apart from the inner sleeve and directly engaging the elastomeric bumper, the outer sleeve including a first end and an opposite second end; and
    a one-piece monolithic ferrule including a cylindrical sidewall surrounding a portion of the inner sleeve, an end wall, a radially extending flange and a collar, the end wall radially inwardly extending from a first end of the side wall and overlapping the first end face of the inner sleeve, the flange radially outwardly extending from a second end of the sidewall, the collar having an outer surface positioned within the outer sleeve and within the first annular void, the outer surface being spaced apart from the elastomeric bumper.

14. The elastomeric bushing according to claim 13, wherein radial movement of the outer sleeve relative to the inner sleeve is limited by the collar and the elastomeric bumper.

15. The elastomeric bushing according to claim 13, wherein the elastomeric bumper is bonded to the inner sleeve.

16. The elastomeric bushing according to claim 13, wherein the inner sleeve is coaxially aligned with the outer sleeve.

17. The elastomeric bushing according to claim 13, wherein the inner sleeve axially extends beyond the outer sleeve at each end of the outer sleeve.

18. The elastomeric bushing according to claim 13, wherein a load attempting to axially move the outer sleeve relative to the inner sleeve is reacted by the collar after a space between the collar and the elastomeric bumper is eliminated.

19. The elastomeric bushing according to claim 13, wherein each of the end wall, the sidewall, the flange and the collar of the ferrule have substantially the same thickness.

20. The elastomeric bushing according to claim 13, wherein the collar is shaped as a cylinder having an outer surface and an inner surface spaced apart from the both of the inner sleeve and the elastomeric bumper.

* * * * *